F. G. HALL.
MECHANICAL DIRECTORY.
APPLICATION FILED NOV. 16, 1907.

946,034.

Patented Jan. 11, 1910.
6 SHEETS—SHEET 1.

Witnesses:

Inventor;
Frank G. Hall:
By Geo. H. Strong.
Atty.

F. G. HALL.
MECHANICAL DIRECTORY.
APPLICATION FILED NOV. 16, 1907.

946,034.

Patented Jan. 11, 1910.
6 SHEETS—SHEET 2.

WITNESSES
F. E. Maynard

INVENTOR:
Frank G. Hall;
BY Geo. H. Strong.
ATTORNEY

F. G. HALL.
MECHANICAL DIRECTORY.
APPLICATION FILED NOV. 16, 1907.

946,034.

Patented Jan. 11, 1910.
6 SHEETS—SHEET 3.

Witnesses:
F. E. Maynard.

Inventor:
Frank G. Hall;
By Geo. H. Strong.
Atty.

F. G. HALL.
MECHANICAL DIRECTORY.
APPLICATION FILED NOV. 16, 1907.

946,034.

Patented Jan. 11, 1910.
6 SHEETS—SHEET 4.

WITNESSES
F. E. Maynard

INVENTOR:
Frank G. Hall;
BY Geo. H. Strong.
ATTORNEY

F. G. HALL.
MECHANICAL DIRECTORY.
APPLICATION FILED NOV. 16, 1907.

946,034.

Patented Jan. 11, 1910.
6 SHEETS—SHEET 5.

WITNESSES

INVENTOR:
Frank G. Hall;
BY Geo. H. Strong.
ATTORNEY

F. G. HALL.
MECHANICAL DIRECTORY.
APPLICATION FILED NOV. 16, 1907.
946,034.
Patented Jan. 11, 1910.
6 SHEETS—SHEET 6.
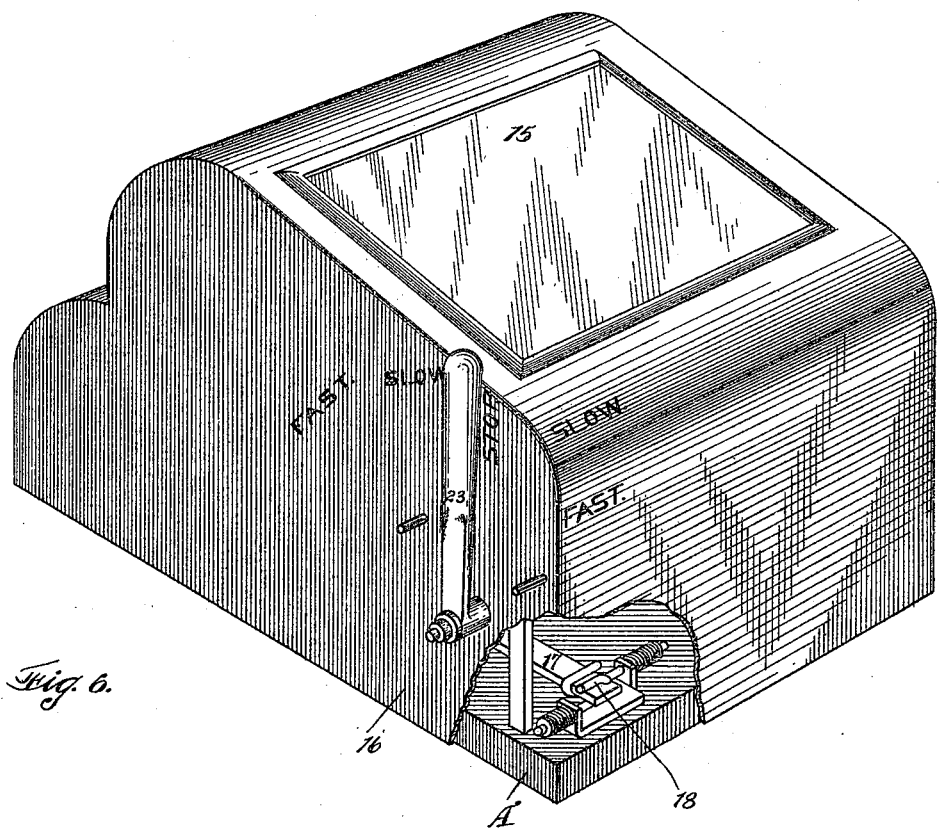
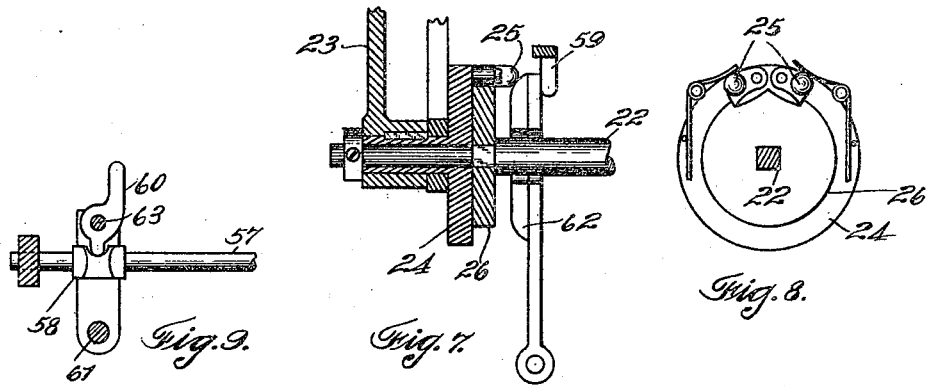
WITNESSES
F. E. Maynard
INVENTOR;
Frank G. Hall;
BY Geo. H. Strong.
ATTORNEY

UNITED STATES PATENT OFFICE.

FRANK G. HALL, OF RIVERSIDE, CALIFORNIA.

MECHANICAL DIRECTORY.

946,034.   Specification of Letters Patent.   Patented Jan. 11, 1910.

Application filed November 16, 1907. Serial No. 402,440.

*To all whom it may concern:*

Be it known that I, FRANK G. HALL, citizen of the United States, residing at Riverside, in the county of Riverside and State of California, have invented new and useful Improvements in Mechanical Directories, of which the following is a specification.

This invention relates to directories.

The object of the invention is to provide an advertising, business, residence, or other form of reference directory on which the advertising or other data is printed upon a web of material adapted to be wound from one reel to another; which directory may be electrically operated and controlled by the operator to run in either direction and at any speed; in which the reels will be automatically reversed when the end of the web is reached; and which directory shall be comparatively simple in construction, easy to manipulate, not likely to get out of order, and so protected as not to be tampered with by unauthorized persons.

The invention consists of the parts and the construction and combination of parts as hereinafter more fully described and claimed, having reference to the accompanying drawings, in which—

Figure 1:
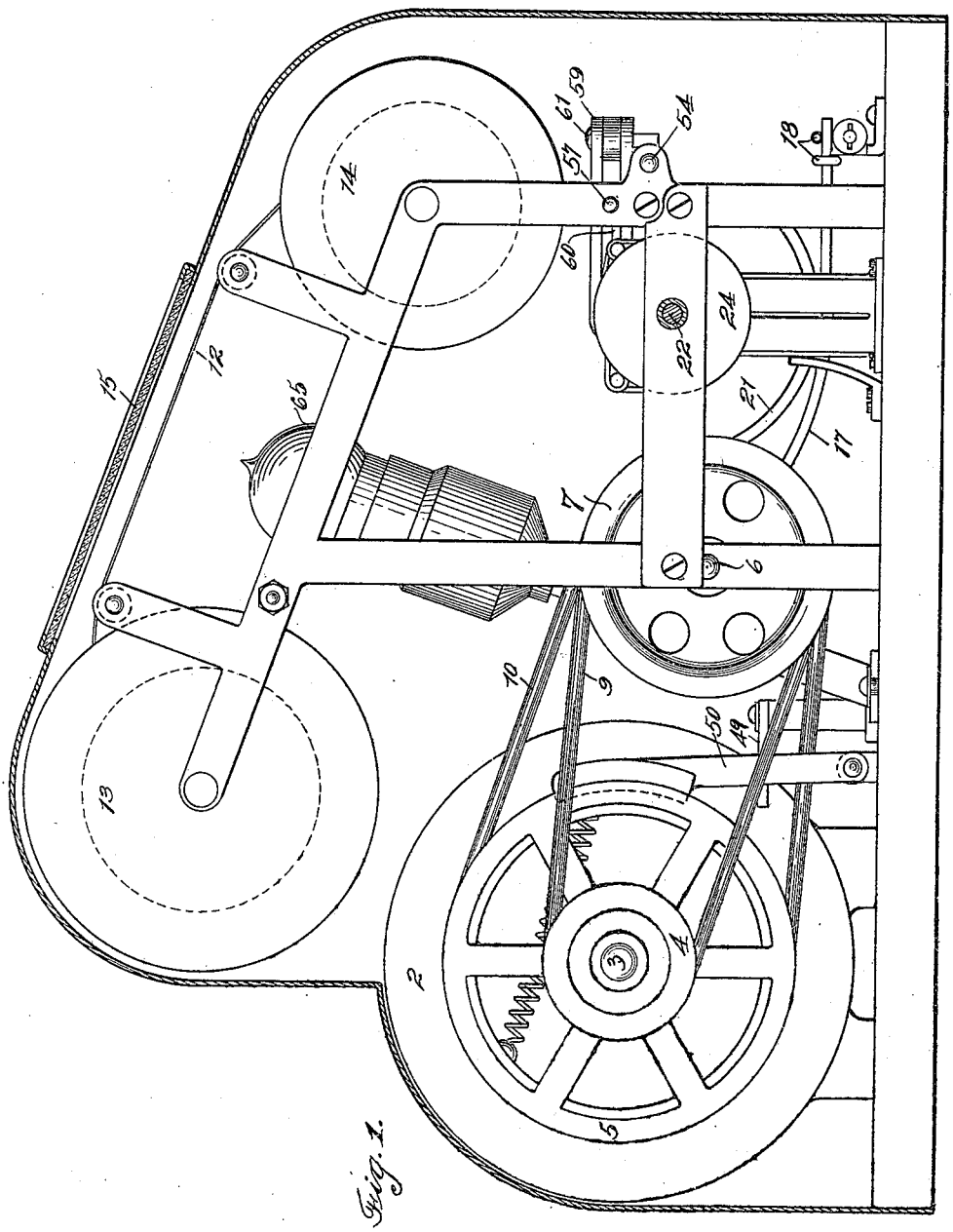
Figure 2:
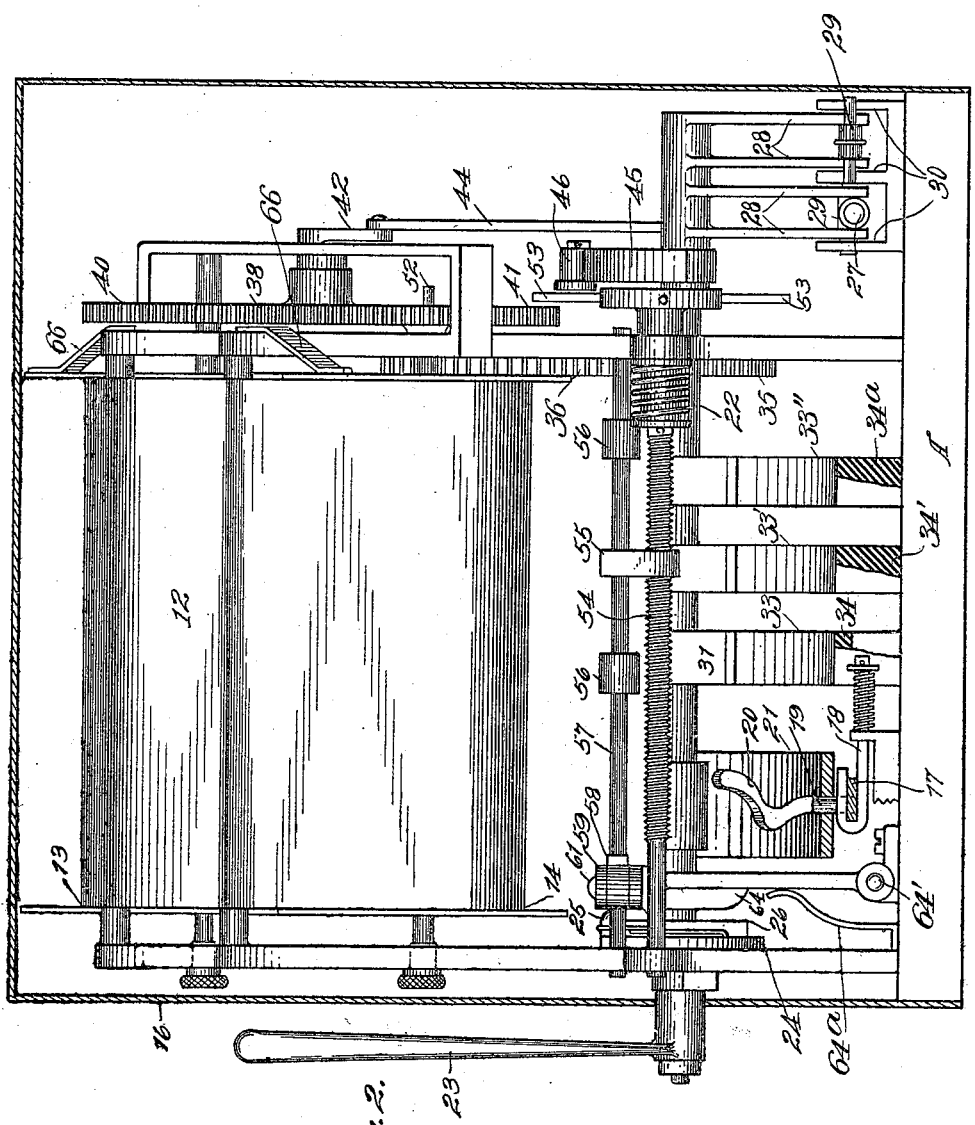
Figure 3:
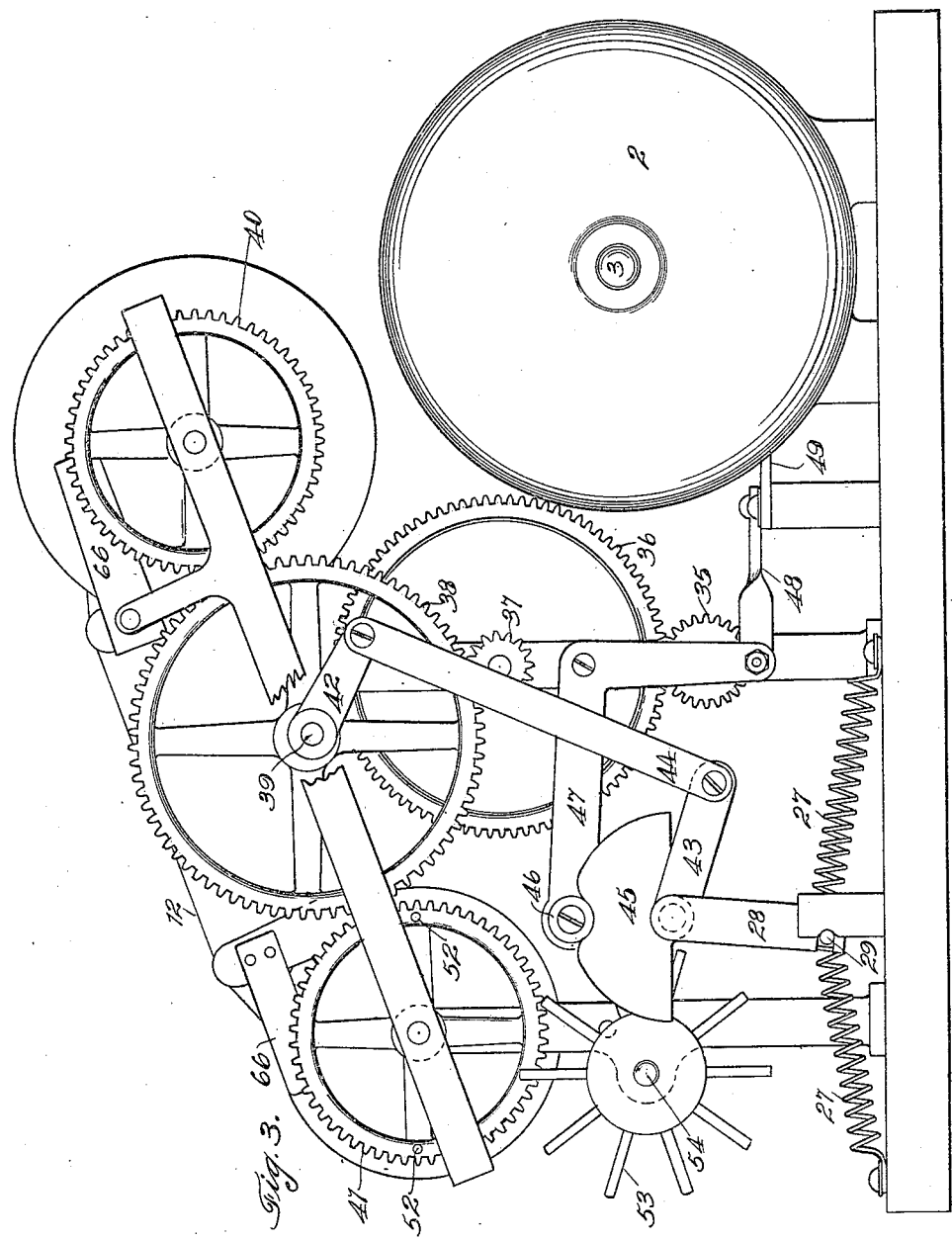
Figure 4:
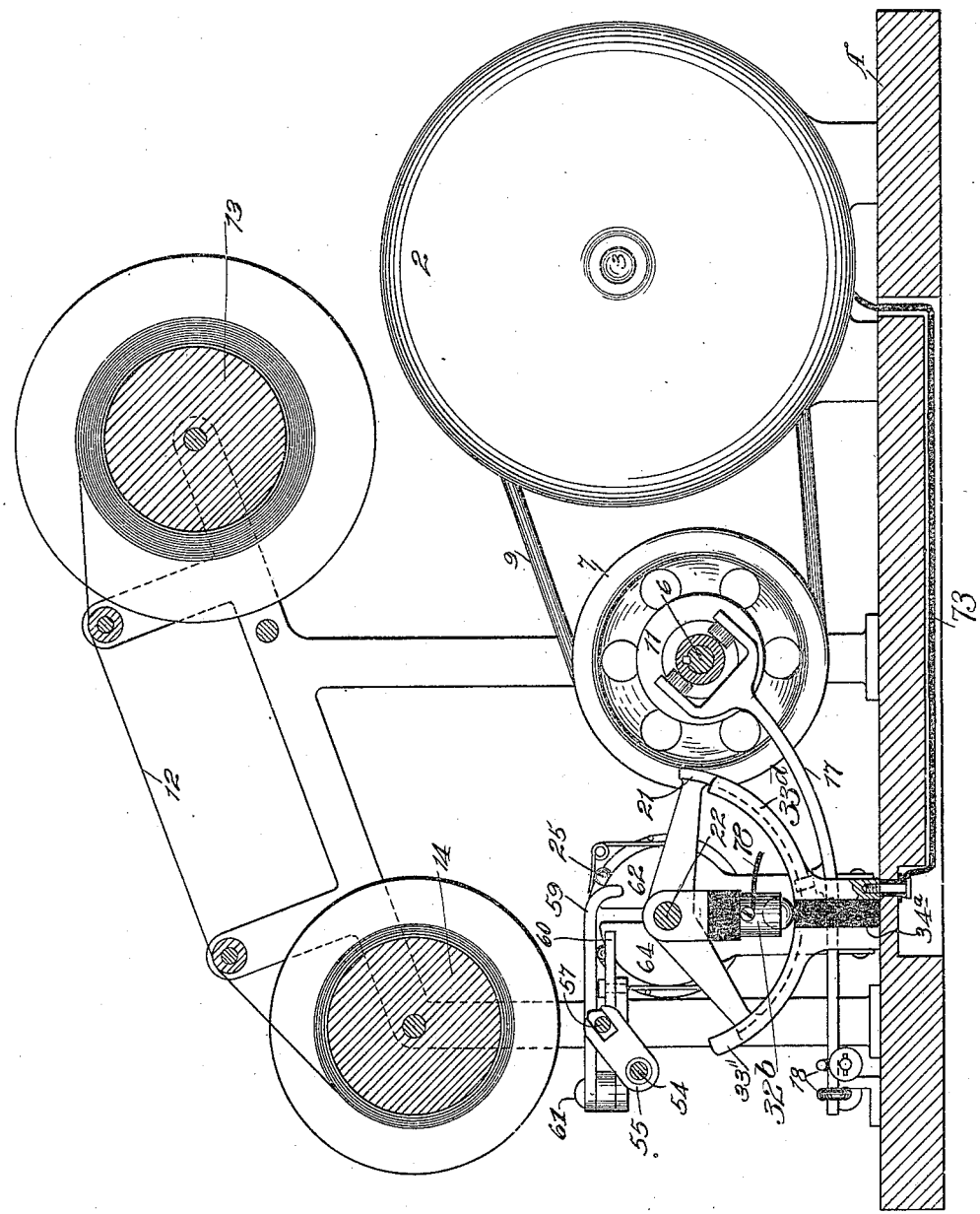
Figure 5:
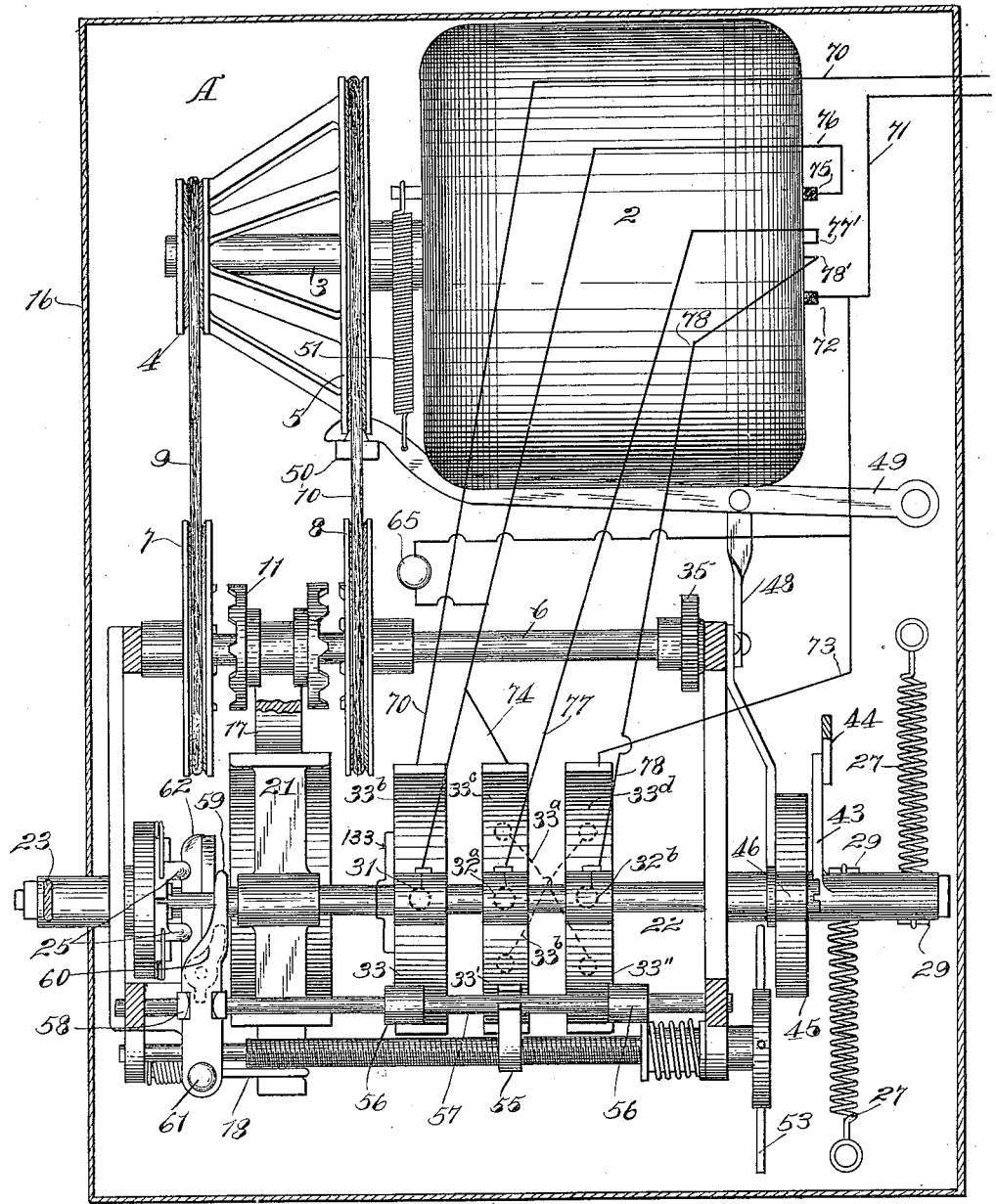

Figure 1 is an elevation of the left-hand side of the machine, with portions of the gearing omitted, and showing the casing in section. Fig. 2 is a front elevation of the mechanism, with the motor and coacting parts omitted. Fig. 3 is an elevation of the right side of the apparatus, with the mechanism shown in Fig. 1 omitted. Fig. 4 is a vertical section, longitudinally. Fig. 5 is a plan view of the mechanism. Fig. 6 is a perspective view of the device. Figs. 7 and 8 are sectional and elevational detail views of the automatic release. Fig. 9 is a detail view of the release member.

The apparatus herein described comprises an actual and successfully operated machine, and while I shall describe the details of the invention as actually embodied in practice, it will be manifest that various changes in the details of construction might be made, without transcending the scope of the appended claims.

A represents a suitable bed-plate on which the apparatus is mounted.

2 is a small motor of suitable capacity for the work in hand.

The motor shaft 3 carries two grooved pulleys 4—5 of different diameters, from whence motion is transmitted to a countershaft 6, which latter carries the two loose pulleys 7—8 which are here shown as of the same size. A belt 9 or any other suitable form of connection connects pulleys 4—7, and a belt 10 connects the other pulley 5 with pulley 8.

11 is a sliding clutch member adapted when moved in one direction to lock the normally loose pulley 7 to shaft 6, and so drive the countershaft 6 slowly; when the clutch 11 is shifted in the opposite direction it will release pulley 7 and lock pulley 8 to the shaft 6, so that the latter will revolve in the same direction as before, but at high speed. The slow drive is for the purpose of enabling the web or strip 12, which constitutes the directory sheet, to move at reading speed, while the rapid drive permits a quick winding and unwinding of the web to and from the respective reels or rolls 13—14. These directory reels or rolls 13—14 are suitably journaled in fixed parts of the frame, and the web or directory strip 12 is adapted to traverse the glazed space or window 15 in the protecting casing 16.

The mechanism for operating the reels or rolls and correspondingly moving the web in either direction and at any desired rate of speed constitutes the essential features of the present invention.

The clutch 11 is here shown as connected with a lever 17 yieldingly fulcrumed at one end by the spring-actuated hooks 18. The lever carries a pin 19 engaging in a sinuous cam groove 20 of the segment 21, and which latter is fixed to a shaft 22. By rocking shaft 22 in one direction, the cam groove 20 will first cause the clutch 11 to interlock with the slow speed pulley 7. If it is wanted to run the web at higher speed, the shaft 22 is rocked still farther in the same direction and the cam groove shifts the clutch in the opposite direction, releasing slow pulley 7 and interlocking with fast pulley 8. To reverse the web the shaft 22 and segment 21 are brought back to central, normal position and then rocked in the opposite direction; high or low speed being obtained according to the distance the shaft is rocked.

The operation of the shaft 22 is effected by means of the operating lever or handle 23. which is fixed to a disk 24; both the disk 24 and handle 23 being loose on the shaft 22. These parts, however. are locked to the shaft (the locked position being their normal position) by appropriate means, as the pawls 25 carried by disk 24, engaging corresponding notches in the disk 26 which is fixed to shaft 22. The shaft 22 and cam segment 21 are held in normally inert position, with the clutch in neutral position between the pulleys 7—8, by means of the springs 27 which are anchored one at each side of a corresponding pair of arms 28 on shaft 22. The ends of these arms are notched to engage with cross-heads 29 fixed to the free ends of the springs, and upright guides 30 limit the operation of the springs in one direction. When the shaft 22 is rocked in one direction, one pair of arms 28 will pick up one cross-head 29, placing that spring on tension so that the spring will return it again to normal position whenever that spring is allowed to act. The object of the spring-actuated arms 28 is to automatically throw out the clutch 11 whenever an end of the web is approached on one or the other of the reels 13—14. In the operation of the device, the switch 31 is designed to close the circuit, while the switches $32^a$—$32^b$ operate the brushes to run the motor in the desired direction.

As shown in Figs. 2 and 5, the shaft 22 carries three electric switch-contacts 31—$32^a$—$32^b$. Coöperating with each of the contact points is a respective contact segment. Thus contact point 31 moves over a segment consisting of two quadrants, 33—$33^b$, Fig. 5, which are always in electrical connection as by wire 133, but which quadrants have inserted between them an insulating block 34, Fig. 2; contact point $32^a$ moves over the quadrant $33^c$—$33'$ electrically separated by a block $34'$; and contact point $32^b$ is movable over its quadrants $33^d$—$33''$ which are electrically separated by the block $34^a$. Quadrants $33^c$ and $33''$ and quadrants $33^d$ and $33'$ are connected diagonally by the crossed wires $33^a$ and $33^b$. Whenever the handle 23 is turned so that all the contact points rest on their respective blocks 34—$34'$—$34^a$, the current is cut out of the motor, and the machine is at rest. The switch point 31 and the quadrants 33—$33^b$ constitute the starting switch, and whenever the handle 23 and the shaft 22 are rocked to carry the point 31 off of its insulating block 34 onto one or the other of the contact quadrants 33—$33^b$, the motor is set in motion; the direction of the motor being controlled by contacts $32^a$ and $32^b$ and the connections about to be described.

Referring to Fig. 5, 70 is one main feed wire which connects with the segment $33^b$ (and consequently also with the segment 33). A wire 76 connects the contact point 31 with the binding post 75 of the motor. 71 is the other main feed wire which connects with the other binding post 72 of the motor. This motor starts on what I call a set of governor brushes $77'$—$78'$, and which brushes control the direction of the motor, by sending the current in one wire, as 77, connected to the brush $77'$, the motor runs in one direction, and by sending it in the other wire 78 connected to the brush $78'$, the motor revolves in the opposite direction. The motor can only be reversed by use of the brushes. There are four wires entering the motor; the two outside wires 76—71 are the main wires, and the two center wires 77—78 are the reverse wires. By throwing the lever 23 so that the contact points $32^a$—$32^b$ rest on the segments $33^c$—$33^d$, I close the circuit 70 and 76 through the motor. I shunt the governor wires from 76 through 74 to the segment $33^c$ to the point $32^a$, through the wire 77 to the brush $77'$; out of the brush $78'$ through the wire 78 to the contact point $32^b$ to the segment $33^d$, through the wire 73 into the main 71 and to the motor, which will run in one direction. To reverse, I throw the lever 23 in the opposite direction which carries the contact points $32^a$ and $32^b$ onto segments $33'$ and $33''$ when the same operation is repeated, except the crossed wires $33^a$ and $33^b$ send the current in at the brush $78'$ and out at the brush $77'$ through the apparatus, which reverses the direction of the current in the brushes only. I shunt a lamp 65 from the two main lines 76—73.

The operation of the reels from shaft 6 is effected through the following connections: Shaft 6 carries a pinion 35 meshing a master-gear 36. The latter carries a pinion 37 in continual mesh with a shifting gear 38. Gear 38 is mounted on an eccentric 39, and is adapted to be moved to engage one or other of the gears 40—41 fixed to the respective reels 13—14. Eccentric 39 is rocked to carry gear 38 in mesh with one or other of the gears 40—41 by a crank-arm 42 on the eccentric, and crank-arm 43 on shaft 22, and a connecting link 44. Thus, when shaft 22 is rocked it simultaneously rocks the eccentric 39, carries gear 38 into mesh with one or other of the gears 40—41, according to the direction it is desired to run the web, and at the same time one or other of the switches $32^a$—$32^b$ closes the circuit to the motor, so that the latter is run in the desired direction. Shaft 22 also carries a segmental cam 45 having a central notch in which a roller 46 on the bell-crank lever 47 normally rests. This bell-crank is connected by a link 48 with a brake lever 49 which operates the friction brake shoe 50; this brake shoe being normally held against the pulley 5 by the spring 51. The moment, of course, that the shaft 22 is rocked to start the motor, the cam 45 is rocked to lift roller 46, turn the bell-crank, and release the brake. Whenever the parts are returned to normal inert position, the brake is on; the brake serving to stop the motor instantly whenever the matter sought for in the directory is found, or whenever it is desired to reverse; the operating lever being first turned to neutral position to cut off the current.

In order to prevent the paper or web from completely unwinding from either roll, I arrange a system of automatic cut-outs which is operated by two pins 52 on gear 41; these pins being adapted to engage a star-wheel 53 on a worm-shaft 54. This worm carries the traveling nut 55 adapted, when moved to its limit in either direction, to engage one or other of the stop collars 56 on a shifting rod 57 suitably mounted for reciprocation in the frame of the machine. This rod 57 carries a block 58 which block is adapted, when the rod is moved in one direction, to oscillate a lever 59, and when moved in the other direction, to operate a lever 60. Lever 59 is fulcrumed at 61 and bears against a releasing cam 62; lever 60 is fulcrumed at 63 between its ends, and bears against a releasing cam 64. Each of these releasing cams is adapted, according as shaft 22 is rocked in one direction or the other, to engage the under side of pawls 25, lift them, release the disk 26, and allow the springs 27 to act to return shaft 22 and switch members to initial inert or cut-out position. The cams 62—64, Fig. 7, are carried on lever arms which are pivoted, respectively, at 62'—64', Figs. 1, 2 and 4. Respective springs 64$^a$—62$^a$ maintain the cams 64—62 out of engagement with the pawls 25.

It will thus be seen that the stopping of the motor may be done entirely automatically, so that the machine may not be left running.

In order to permit the directory web or strip to be read anywhere and at any time, an electric light 65 is suitably disposed inside the casing.

It will be observed that whenever one reel is winding up, the other is disconnected from the driving means. The reason for this is that if the driving connections were permanent there would be difficulty in winding and unwinding the reels, because one roll would grow larger and the other smaller, causing the empty roll to run faster, with a tendency to tear the paper. The momentum of the rolls 13—14 is maintained uniform, even when unwinding, by suitable means, as the friction brakes 66.

The yielding fulcrum afforded the clutch lever 17 by the spring-supported hooks 18 insures against stripping of the gears or breaking of the mechanism, by suddenly throwing in or reversing the clutch when the motor is moving at a high speed.

To operate the machine, the handle 23 is gripped by the left hand, and if it is desired to make the directory strip travel upward or away from the operator, the handle is pushed forward from its normal inert position. By moving the handle to a point suitably indicated on the casing as "Slow" the clutch is shifted to throw in the slow gear, the brake 50 released, and the web moves at reading speed. If one wants to have any considerable length of tape traverse the window at rapid speed, the lever is pushed still farther forward to a point marked "Fast", whereupon the clutch 11 is shifted to engage the high speed gear. The speed of travel of the web may be instantly slowed up by pulling back the lever, and when the desired point on the web is reached the lever is returned to initial position, the brake 50 operating immediately to stop the motor. If for any reason the lever should not be shifted to inert position so as to disengage the clutch the traveling nut 55 on the worm 54 would engage one or other of the stops 56, and by the connections previously described the pawls 25 will be released, with the result that the springs 27 will immediately turn the shaft into initial position, cutting out the current, applying the brake, and releasing the clutch.

The distance apart of the collars 56 on the shifting rod 57 depends on the length of the web; for a longer web they would be farther apart, and for a shorter web they would be closer together. This is an important feature because it enables a longer or shorter web to be applied to the same machine, and by a little adjustment make the cut-out of the current and the stopping of the machine entirely automatic, whenever one or other of the rolls is nearly unwound.

Having thus described my invention, what I claim and desire to secure by Letters Patent is—

1. In a directory, the combination of a pair of directory rolls, a directory strip connected thereto and windable from one to the other in either direction, electrically operated mechanism for actuating the rolls, an operating lever, means controlled by said operating lever for setting said electrical mechanism in operation, for operating the rolls in either direction, and for operating the rolls at different speeds, and mechanism independent of said operating lever and set in operation by the rolls to cut out the current.

2. In a directory, the combination of a pair of directory rolls, a directory strip connected thereto and windable from one to the other in either direction, electrically operated mechanism for actuating the rolls, an operating lever, means controlled by said operating lever for setting said electrical mechanism in operation and means controlled by the operating lever whereby on the cutting in of the electric current the electrical mechanism may be operated in either direction, and mechanism independent of said operating lever for automatically cutting out the electrical current from the apparatus.

3. In a directory, the combination of directory rolls, a directory strip carried thereby and operable in either direction, a driveshaft, a countershaft, variable speed drive connections between said shafts, an operating lever, and mechanism controlled by the operating lever for transmitting motion from said countershaft to either of the rolls to operate the directory strip.

4. In a directory, the combination of directory rolls, a directory strip carried thereby and operable in either direction, a driveshaft, a countershaft, variable speed drive connections between said shafts, an operating lever, mechanism controlled by the operating lever for transmitting motion from said countershaft to either of the rolls to operate the directory strip, and mechanism controlled by one of the rolls for automatically stopping the travel of the strip when the latter has traveled a predetermined distance in either direction.

5. In a directory, the combination of directory rolls, a directory strip carried thereby and operable in either direction, a driveshaft, a countershaft, variable speed drive connections between said shaft, an operating lever, and mechanism controlled by the operating lever for transmitting motion from said countershaft to either of the rolls to operate the directory strip, said mechanism including a gear mounted on an eccentric, corresponding gears on the rolls between which last-named gears said eccentrically mounted gear is movable to engage one and correspondingly disengage the other of said gears.

6. In a directory, the combination of a pair of directory rolls, a directory strip windable from one of said rolls to the other, and vice versa, a drive-shaft, a countershaft, multiple speed drive connections between the drive-shaft and said countershaft said multiple speed drive connections including a clutch mechanism on one of said shafts, drive connections between the countershaft and the rolls, an operating lever, a rock-shaft operable by said operating lever, said clutch mechanism operable by the rock-shafts.

7. In a directory, the combination of a pair of directory rolls, a directory strip windable from one of said rolls to the other, and vice versa, a drive-shaft, a countershaft, multiple speed drive connections between the drive-shaft and said countershaft said multiple speed drive connections including a clutch mechanism on one of said shafts, drive connections between the countershaft and the rolls, an operating lever, a rock-shaft operable by said operating lever, said clutch mechanism operable by the rock-shaft, and means controlled by the rolls for actuating the clutch mechanism independent of the said operating lever.

8. In a directory, the combination of a movable directory sheet, a motor-shaft, a motor, a countershaft, a loose pulley on the countershaft and a corresponding fixed pulley on the motor-shaft, connections between the pulleys, a clutch on the countershaft engageable and disengageable with the loose pulley, means for operating the directory sheet in either direction from the countershaft, a rock-shaft, and means controlled by the rock-shaft for operating the clutch.

9. In a directory, the combination of a movable directory sheet, a motor-shaft, a motor, a countershaft, a loose pulley on the countershaft and a corresponding fixed pulley on the motor-shaft, connections between the pulleys, a clutch on the countershaft engageable and disengageable with the loose pulley, means for operating the directory sheet in either direction from the countershaft, a rock-shaft, means controlled by the rock-shaft for operating the clutch, an operating lever connected with the rock-shaft for operating the latter, means controlled by the travel of the directory sheet for disengaging the lever from the rock-shaft, and means to cause the rock-shaft automatically to throw the clutch out of gear.

10. In a directory, the combination of a movable directory sheet, a motor-shaft, a motor, a countershaft, a loose pulley on the countershaft and a corresponding fixed pulley on the motor-shaft, connections between the pulleys, a clutch on the countershaft engageable and disengageable with the loose pulley, means for operating the directory sheet in either direction from the countershaft, a rock-shaft, means controlled by the rock-shaft for operating the clutch, and a switch mechanism controlled by the rock-shaft.

11. In a directory, the combination of a movable directory sheet, a motor-shaft, an electric motor, a countershaft, a loose pulley on the countershaft and a corresponding fixed pulley on the motor-shaft, connections between the pulleys, a clutch on the countershaft engageable and disengageable with the loose pulley, means for operating the directory sheet in either direction from the countershaft, a rock-shaft, means controlled by the rock-shaft for operating the clutch, a switch mechanism controlled by the rock-shaft, an operating lever for operating the rock-shaft, and means controlled by the travel of the strip for automatically rocking the rock-shaft independent of the operating lever to open the switch and cut out the electric current.

12. In a directory, the combination of a movable directory sheet, a motor-shaft, a motor, a countershaft, a loose pulley on the countershaft and a corresponding fixed pulley on the motor-shaft, connections between the pulleys, a clutch on the countershaft engageable and disengageable with the loose pulley, means for operating the directory sheet in either direction from the countershaft, a rock-shaft, a lever connected with the clutch and having a laterally yielding fulcrum, and a cam member on the rock-shaft for operating said lever.

13. In a directory, the combination of a movable directory sheet, a motor-shaft, a motor, a countershaft, a loose pulley on the countershaft and a corresponding fixed pulley on the motor-shaft, connections between the pulleys, a clutch on the countershaft engageable and disengageable with the loose pulley, means for operating the directory sheet in either direction from the countershaft, a rock-shaft, a lever connected with the clutch and having a laterally yielding fulcrum, a cam member on the rock-shaft for operating said lever, an operating lever loose on the rock-shaft, means for connecting it rigidly with the rock-shaft to operate the latter on the oscillation of the lever, and mechanism operable by the travel of the directory sheet to disconnect the lever from the rock-shaft.

14. In a directory, the combination of a movable directory sheet, a motor-shaft, a motor, a countershaft, a loose pulley on the countershaft and a corresponding fixed pulley on the motor-shaft, connections between the pulleys, a clutch on the countershaft engageable and disengageable with the loose pulley, means for operating the directory sheet in either direction from the countershaft, a rock-shaft, yieldable connections between the rock-shaft and the clutch for operating the latter on the oscillation of the rock-shaft, and an operating lever connectible and disconnectible with the rock-shaft.

15. In a directory, the combination of a movable directory sheet, a motor-shaft, a motor, a countershaft, a loose pulley on the countershaft and a corresponding fixed pulley on the motor-shaft, connections between the pulleys, a clutch on the countershaft engageable and disengageable with the loose pulley, means for operating the directory sheet in either direction from the countershaft, a rock-shaft, yieldable connections between the rock-shaft and the clutch for operating the latter on the oscillation of the rock-shaft, an operating lever connectible and disconnectible with the rock-shaft, and a switch mechanism operable by the rock-shaft.

16. In a directory, the combination of a movable directory sheet, a motor-shaft, a motor, a countershaft, a loose pulley on the countershaft and a corresponding fixed pulley on the motor-shaft, connections between the pulleys, a clutch on the countershaft engageable and disengageable with the loose pulley, means for operating the directory sheet in either direction from the countershaft, a rock-shaft, connections between the rock-shaft and clutch for operating the latter on the oscillation of the rock-shaft, and a switch carried by the rock-shaft.

17. In a directory, the combination of a movable directory strip, a motor-shaft, a motor, a countershaft, loose pulleys on the countershaft, fixed pulleys of different diameters on the motor-shaft, drive connections between the pulleys, a clutch on the countershaft movable between the pulleys to lock one or the other of said loose pulleys to the countershaft, drive connections between the countershaft and the movable directory sheet, a rock-shaft, a cam segment on the rock-shaft, a clutch lever operable by the cam segment and having a yielding fulcrum, and means for rocking the rock-shaft.

18. In a directory, the combination of a movable directory strip, a motor-shaft, a motor, a countershaft, loose pulleys on the countershaft, fixed pulleys of different diameters on the motor-shaft, drive connections between the pulleys, a clutch on the countershaft movable between the pulleys to lock one or the other of said loose pulleys to the countershaft, drive connections between the countershaft and the movable directory sheet, a rock-shaft, a cam segment on the rock-shaft, a clutch lever operable by the cam segment and having a yielding fulcrum, means for rocking the rock-shaft, and switch mechanism carried by the rock-shaft.

19. In a directory, the combination of a movable directory strip, a motor-shaft, a motor, a countershaft, loose pulleys on the countershaft, fixed pulleys of different diameters on the motor-shaft, drive connections between the pulleys, a clutch on the countershaft movable between the pulleys to lock one or the other of said loose pulleys to the countershaft, drive connections between the countershaft and the movable directory sheet, a rock-shaft, a cam segment on the rock-shaft, a clutch lever operable by the cam segment and having a yielding fulcrum, means for rocking the rock-shaft, switch mechanism carried by the rock-shaft, and mechanism independent of said means for rocking the rock-shaft for operating the latter to disconnect the clutch and open the switch.

20. In a directory, the combination of a pair of directory rolls, a directory strip connected thereto and windable from one to the other in either direction, a motor, a motor-shaft, connections between the motor-shaft and the rolls for operating the latter in either direction, and means including an operating lever for controlling the electric current through the motor and for connecting and disconnecting the drive connections between the motor-shaft and said rolls.

21. In a directory, the combination of a pair of directory rolls, a directory strip connected thereto and windable from one to the other in either direction, a motor, a motor-shaft, connections between the motor-shaft and the rolls for operating the latter in either direction, means including an operating lever for controlling the electric current through the motor and for connecting and disconnecting the drive connections between the motor-shaft and said rolls, and mechanism operable by the rolls for severing said electrical and said drive connections independent of said lever.

22. In a directory, the combination of a pair of directory rolls, a directory strip windable from one to the other, a motor, a motor-shaft, drive connections between the motor-shaft and the rolls for winding the strip in either direction, and means for controlling said winding operations, said last-named means including a rock-shaft, clutch mechanism and switch mechanism controlled by the rock-shaft, and an operating lever connectible with the rock-shaft.

23. In a directory, the combination of a pair of directory rolls, a directory strip windable from one to the other, a motor, a motor-shaft, drive connections between the motor-shaft and the rolls for winding the strip in either direction, means for controlling said winding operations, said last-named means including a rock-shaft, clutch mechanism and switch mechanism controlled by the rock-shaft, and an operating lever connectible with the rock-shaft, means for maintaining the rock-shaft in neutral position, with the clutch mechanism and switch mechanism inert, and mechanism controlled by the travel of the strip for automatically disconnecting the operating lever from the rock-shaft to stop the travel of the strip at certain determined points.

24. In a directory, the combination of a pair of directory rolls, a directory strip windable from one to the other, a motor, a motor-shaft, drive connections between the motor-shaft and the rolls for winding the strip in either direction, means for controlling said winding operations, said last-named means including a rock-shaft, clutch mechanism and switch mechanism controlled by the rock-shaft, and an operating lever connectible with the rock-shaft, means including a star-wheel, worm and traveling nut operable by one of the rolls for disconnecting said operating lever from the rock-shaft, and means for placing the rock-shaft automatically in position to disconnect the drive connections and the electrical connections.

25. In a directory, the combination of a pair of directory rolls, a directory strip windable from one to the other, a motor, a motor-shaft, drive connections between the motor-shaft and the rolls for winding the strip in either direction, means for controlling said winding operations, said last-named means including a rock-shaft, clutch mechanism and switch mechanism controlled by the rock-shaft, and an operating lever connectible with the rock-shaft, means for maintaining the rock-shaft in neutral position, with the clutch mechanism and switch mechanism inert, mechanism controlled by the travel of the strip for automatically disconnecting the operating lever from the rock-shaft to stop the travel of the strip at certain determined points, and a brake operable to stop the motor and controlled by the rock-shaft.

26. In a directory, the combination of a pair of directory rolls, a directory strip windable from one to the other, a motor, a motor-shaft, drive connections between the motor-shaft and the rolls for winding the strip in either direction, means for controlling said winding operations, said last-named means including a rock-shaft, clutch mechanism and switch mechanism controlled by the rock-shaft, and an operating lever connectible with the rock-shaft, means including a star-wheel, worm and traveling nut operable by one of the rolls for disconnecting said operating lever from the rock-shaft, means for placing the rock-shaft automatically in position to disconnect the drive connections and the electrical connections, and a brake for the motor operable by a cam on the rock-shaft.

27. In a directory, the combination of a movable directory sheet, a motor-shaft, a motor, a countershaft, a loose pulley on the countershaft and a corresponding fixed pulley on the motor-shaft, connections between the pulleys, a clutch on the countershaft engageable and disengageable with the loose pulley, means for operating the directory sheet in either direction from the countershaft, a rock-shaft, means controlled by the rock-shaft for operating the clutch, a switch mechanism controlled by the rock-shaft, a cam member on the rock-shaft, and a brake operable by the cam and operable on the motor-shaft to stop the latter on the cutting out of the current.

In testimony whereof I have hereunto set my hand in presence of two subscribing witnesses.

FRANK G. HALL.

Witnesses:
JOHN BAIRD,
W. S. WEBSTER.